(12) United States Patent
Filla

(10) Patent No.: US 9,032,725 B2
(45) Date of Patent: May 19, 2015

(54) METHOD FOR OPERATING A WORKING MACHINE AND A WORKING MACHINE

(75) Inventor: Reno Filla, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 1416 days.

(21) Appl. No.: 12/444,402

(22) PCT Filed: Oct. 25, 2006

(86) PCT No.: PCT/SE2006/001203
§ 371 (c)(1),
(2), (4) Date: Dec. 9, 2009

(87) PCT Pub. No.: WO2008/041892
PCT Pub. Date: Apr. 10, 2008

(65) Prior Publication Data
US 2010/0089050 A1    Apr. 15, 2010

(30) Foreign Application Priority Data

Oct. 6, 2006    (WO) ................. PCT/SE2006/001140
Oct. 6, 2006    (WO) ................. PCT/SE2006/001141

(51) Int. Cl.
*F15B 21/08*    (2006.01)
*B60W 20/00*    (2006.01)
*B60K 6/48*     (2007.10)
*B60W 10/08*    (2006.01)
*B60W 10/20*    (2006.01)
*B60W 10/30*    (2006.01)
*E02F 9/20*     (2006.01)
*E02F 9/22*     (2006.01)

(52) U.S. Cl.
CPC .............. *B60W 20/102* (2013.01); *B60K 6/48* (2013.01); *B60L 2240/425* (2013.01); *B60W 10/08* (2013.01); *B60W 10/20* (2013.01); *B60W 10/30* (2013.01); *B60W 2300/17* (2013.01); *B60W 2510/087* (2013.01); *B60Y 2200/415* (2013.01); *E02F 9/2025* (2013.01); *E02F 9/2075* (2013.01); *E02F 9/2253* (2013.01); *E02F 9/2292* (2013.01); *Y02T 10/6221* (2013.01); *Y02T 10/642* (2013.01); *Y02T 10/84* (2013.01); *B60Y 2300/476* (2013.01)

(58) Field of Classification Search
USPC ..................................................... 60/413, 449
See application file for complete search history.

(56) References Cited

U.S. PATENT DOCUMENTS

| 5,046,924 | A | 9/1991 | Gras et al. | |
|---|---|---|---|---|
| 6,666,022 | B1 * | 12/2003 | Yoshimatsu et al. | 60/413 |
| 7,022,044 | B2 * | 4/2006 | Legner et al. | 477/68 |
| 2004/0098984 | A1 | 5/2004 | Duell et al. | |
| 2007/0193262 | A1 | 8/2007 | Iwamoto | |

FOREIGN PATENT DOCUMENTS

| EP | 1154162 A | 11/2001 |
|---|---|---|
| EP | 1505717 A1 | 2/2005 |

(Continued)

*Primary Examiner* — F. Daniel Lopez
(74) *Attorney, Agent, or Firm* — WRB-IP LLP

(57) ABSTRACT

A method for operating a working machine provided with a power source providing power and a plurality of power consuming systems connected to the power source includes the steps of providing a model predicting a power demanded by at least one of the power consuming systems, detecting at least one operational parameter indicative of a power demand, using the detected operational parameter in the prediction model, and balancing a provided power to the demanded power according to the prediction model.

41 Claims, 7 Drawing Sheets

(56) References Cited

FOREIGN PATENT DOCUMENTS

| EP | 1571352 | A1 | 9/2005 |
| EP | 1720244 | A | 11/2006 |
| WO | 2005081393 | A | 9/2005 |
| WO | 2006016653 | A | 2/2006 |

* cited by examiner

METHOD FOR OPERATING A WORKING MACHINE AND A WORKING MACHINE

BACKGROUND AND SUMMARY

The invention relates to a method for operating a working machine and a working machine.

The invention is applicable on working machines within the field of industrial construction machines, in particular wheel loaders. Thus, the invention will be described with respect to a wheel loader. However, the invention is by no means limited to a particular working machine. On the contrary, the invention may be used in a plurality of heavy working machines, e.g. articulated haulers, trucks, bulldozers and excavators.

Wheel loaders are generally provided with an internal combustion engine, a transmission line, a gearbox, driving wheels and a working hydraulic system.

The combustion engine provides power to the different functions of the wheel loader. In particular, the combustion engine provides power to the transmission line and to the working hydraulic system of the wheel loader.

The transmission line transfers torque from the combustion engine to the gearbox, which in turn provides torque to the driving wheels of the loader. In particular, the gearbox provides different gear ratios for varying the speed of the driving wheels and for changing between forward and backward driving direction of the wheels.

The working hydraulic system is used for lifting operations and/or for steering the wheel loader. For this purpose there are at least one hydraulic working cylinder arranged in the wheel loader for lifting and lowering a lifting arm unit, on which a bucket or other type of attachment or working tool is mounted for example forks. By use of another hydraulic working cylinder, the bucket can also be tilted or pivoted. Further hydraulic cylinders known as steering cylinders are arranged to turn the wheel loader by means of relative movement of a front and rear body part of the wheel loader.

To protect the combustion engine of a wheel loader from sudden rapid changes in the working conditions of the gearbox and the driving wheels it is common to provide the transmission line with a hydrodynamic torque converter or similar arranged between the combustion engine and the gearbox. The hydrodynamic torque converter provides an elasticity that enables a very quick adaptation of the output torque to the changes in the working conditions of the gearbox and the driving wheels. In addition, a torque converter provides an increased torque during particularly heavy working operations, e.g. during acceleration of the wheel loader.

For example, if a wheel loader without the elasticity of a torque converter or similar is driven into an obstacle so that the driving wheels of the vehicle stops this will also stop the combustion engine, since the engine in such designs is rigidly and unyieldingly connected to the rotation of the driving wheels. However, this will not happen if a torque converter or similar is arranged between the engine and the driving wheels or more preferably between the engine and the gear box. On the contrary, if the driving wheels of the wheel loader stops this causes the output side (the turbine side) of the torque converter (the turbine side) to stop whereas the input side (the pump side) continues to rotate together with the engine. The engine will experience a larger internal resistance from the torque converter but it will not come to a standstill.

However, the elasticity of a hydrodynamic torque converter or similar is not present between the working hydraulic system and the combustion engine. On the contrary, the combustion engine provides power to the hydraulic pump or pumps of the working hydraulic system in a more or less direct manner, e.g. by means of a mechanical gear wheel transmission connected between the output shaft of the engine and the input shaft of the pump or pumps. In other words, a rapid increase of the load on the working hydraulic system is transmitted to the combustion engine without any significant attenuation. Naturally, this may cause the combustion engine to stall or cause the power provided by the combustion engine to be fully consumed by the hydraulic system leaving the transmission line without significant power. This may provide an operator of the wheel loader with the highly undesired impression that the engine has become to weak to move the wheel loader in an operable manner. One way of solving the problem of meeting a sudden rapid increase of the load on the working hydraulic system is to run the combustion engine of the wheel loader at the higher end of its speed range. This provides a power margin which makes it easier for the combustion engine to meet a rapid load increase on the hydraulic system, e.g. time to recover by increasing the throttle. However, in general a higher rotational speed leads to significantly increased losses and thus increased fuel consumption. Therefore, with regard to fuel consumption it is better to run the combustion engine at lower rotational speeds.

However, this will give a significantly reduced margin for the combustion engine to recover from sudden rapid increases of the load on the working hydraulic system.

In addition, to ensure that the hydraulic functions are equally fast at the lower rotational speeds, i.e. to ensure the same hydraulic flow at the lower rotational speeds, it is necessary to use larger pumps with higher displacement. A larger pump displacement requires a larger torque from the source driving the pump, i.e. from the combustion engine. In other words, if we move from higher rotational speeds towards lower rotational speeds for reducing losses and fuel consumption we will need hydraulic pumps with a higher displacement, which in turn leads to a higher torque load on the combustion engine. A higher torque load on the combustion engine at a lower rotational speed implies that the engine is utilized even harder. Hence, compared to the utilization at higher rotational speed for powering hydraulic pumps with a lower displacement it has now become even more difficult for the combustion engine to recover from a rapid increase of the load on the working hydraulic system.

Therefore, when designing a modern combustion engine for a working machine such as a wheel loader it is desirable to obtain high output torques at low rotational speeds and to obtain quick reactions on sudden rapid increase of the load on the working hydraulic system. To this end it is common to employ various turbo chargers or air compressors. However, these and other solutions for reinforcing the performance of a combustion engine are commonly in conflict with increasingly harder emission regulations, particularly with respect to exhaustion gases and visible smoke emanating from engine responses to sudden rapid increases of the load on the working hydraulic system. Considering the above there is clearly a need for a working machine provided with an improved and a more flexible ability to meet a sudden rapid increase of the load on the various power requiring and/or torque requiring sub-systems within the working machine.

It is desirable to provide a method for operating a working machine with an improved and a more flexible ability to balance a sudden rapid increase of the load on the various power requiring and/or torque requiring sub-systems within the working machine.

According to an aspect of the present invention, a method is provided for operating a working machine provided with: a power source providing power and a plurality of power consuming systems connected to the power source, characterized by the steps of providing a model predicting a power demanded by at least one of the power consuming systems, detecting at least one operational parameter indicative of a power demand, using the detected operational parameter in the prediction model, and balancing a provided power to the demanded power according to the prediction model. According to a preferred embodiment, the method comprises balancing a provided power to the demanded power so that a load on the power source is reduced.

The prediction model may comprise a characteristic representation of the operative interaction between the power source and the power-consuming systems, such as a mathematical model in the form of for example an advanced dynamic simulation model and/or a less sophisticated equation or system of equations.

The inventive method is preferably utilized in a working machine, in which different power consuming systems are operated simultaneously, such as in a wheel loader. Especially in such an application, it is preferable that the method comprises simultaneously monitoring a demanded power of a plurality of the power consuming systems and correspondingly balancing the power.

Preferably, the power consuming systems comprises a transmission line arranged between the power source and driving wheels of the working machine for transmitting torque from the power source to the driving wheels. Further, the power consuming systems preferably comprises a working hydraulic system comprising at least one hydraulic pump powered by the power source for moving an implement on the working machine and/or for steering the working machine.

According to a preferred embodiment, the method comprises detecting at least one operational parameter indicative of a current working condition of the power source and/or at least one of the power consuming systems. Detecting the operational parameters for these sub-systems (Ae. the power source, the transmission line and the working hydraulic system) creates conditions for providing an earlier indication of the power balance or the coming power balance in a summation point compared to detecting the operational parameters for the summation point, in particularly if the summation point is a fly wheel.

According to a further preferred embodiment, the method comprises detecting at least one operational parameter by detecting at least one input command from a working machine operator. Detecting the commands given to the sub-systems provides an even earlier indication of the power balance or the coming power balance in the summation point. Further, by detecting the operator commands, an accurate prediction of the behaviour of the power source and the power consuming systems may be performed.

Preferably, the method comprises both detection of at least one operational parameter indicative of a current working condition of the power source and/or at least one of the power consuming systems and at least one input command from a working machine operator.

According to a further preferred embodiment of the inventive method, the power consuming systems are connected to the power source via a branching-off portion, and that the prediction model comprises a power summation point, which represents the branching off portion. Thus, the summation point in the prediction model corresponds to a physical point where the power from the power source is divided to the different power consuming systems. In other words, the predicted power to the power consuming systems are subtracted from a predicted power delivered from the power source according to the prediction model. The method preferably comprises balancing the power when the prediction model indicates that the power balance between the power source and the power consuming systems is or will be below zero in the summation point. Further, the method preferably comprises the step of temporarily adjusting the balance until the prediction model indicates a balance condition in which said power is zero or above zero in the summation point.

Said power balancing may be performed in a plurality of alternative and/or contributory ways, such as by adding torque to the transmission line by means of an external power source (such as an electric machine), by effecting the power source and/or at least one of the power consuming systems, and by reducing (such as by scaling down) an actual power provided to at least one of the power consuming systems relative to a demanded power.

Utilizing an external power source is particularly advantageous since this reduces the need for decreasing the performance of the power requiring sub-systems and/or torque requiring sub-systems within the working machine. In addition, the demands on the main power source of the working machine can be relaxed.

The use of at least one electric machine is advantageous, since this enables a flexible and compact design. An electric machine can also be powered by means of a plurality of power sources (e.g. batteries, generators, fuel cells etc), which provides an increased freedom in the design. Moreover, electric machines react fast on commands and they provide a large torque already at low rotational speeds, which is beneficial considering that a rather large torque may have to be supplied fairly fast.

It is preferred that the electric machine is arranged upstream a possible transmission unit arranged in the transmission line, or upstream a possible gearbox arranged in the transmission line. In this way the electric machine does not have to work in both clockwise and counter clockwise directions to accommodate for both a forward and a reverse driving selected by means of the gear box. Moreover, arranging the electric machine upstream the transmission unit enables a more direct torque support to branching-off portion, which in most cases is physically positioned at a point that is located upstream a possible transmission unit.

It is also desirable to provide a working machine with an improved and a more flexible ability to balance a sudden rapid increase of the load on the various power requiring and/or torque requiring sub-systems within the working machine. According to an aspect of the present invention, a working machine is provided with: a power source adapted to provide power and a plurality of power consuming systems connected to the power source, characterized by a control unit which is adapted to predict a power demanded by at least one of the power consuming systems on the basis of at least one operational parameter indicative of a power demand, means for detecting said at least one operational parameter, wherein the detection means is connected to the control unit, and means for balancing a provided power to the demanded power according to the prediction model, wherein said balancing means is connected to the control unit.

The working machine displays the same or similar advantages as the method described above.

Further advantages and advantageous features of the invention are disclosed in the following description.

DEFINITIONS

The term "electric machine" should be understood as a term for an electric motor and/or generator. The electric machine can be driven by electricity to supply an output torque to a shaft or be mechanically driven by receiving torque on a shaft for producing electricity.

The term "transmission unit" comprises hydraulic clutches, both hydrodynamic clutches such as torque converters and hydrostatic clutches, as well as mechanical clutches. Thus, "transmission unit" comprises both torque converters which can increase the torque and ordinary skid clutches without ability to increase the torque.

The term "driving wheels" is meant to comprise vehicle wheels for direct engagement with the ground as well as vehicle wheels for driving a ground engaging member, such as tracks, crawlers or similar.

BRIEF DESCRIPTION OF THE DRAWINGS

A more detailed description of the present invention is given below with reference to a plurality of exemplifying embodiments as illustrated in the appended figures, in which.

DETAILED DESCRIPTION OF PREFERRED EMBODIMENTS OF THE INVENTION

Structure of Preferred Embodiments

A Working Machine

Figure 1:
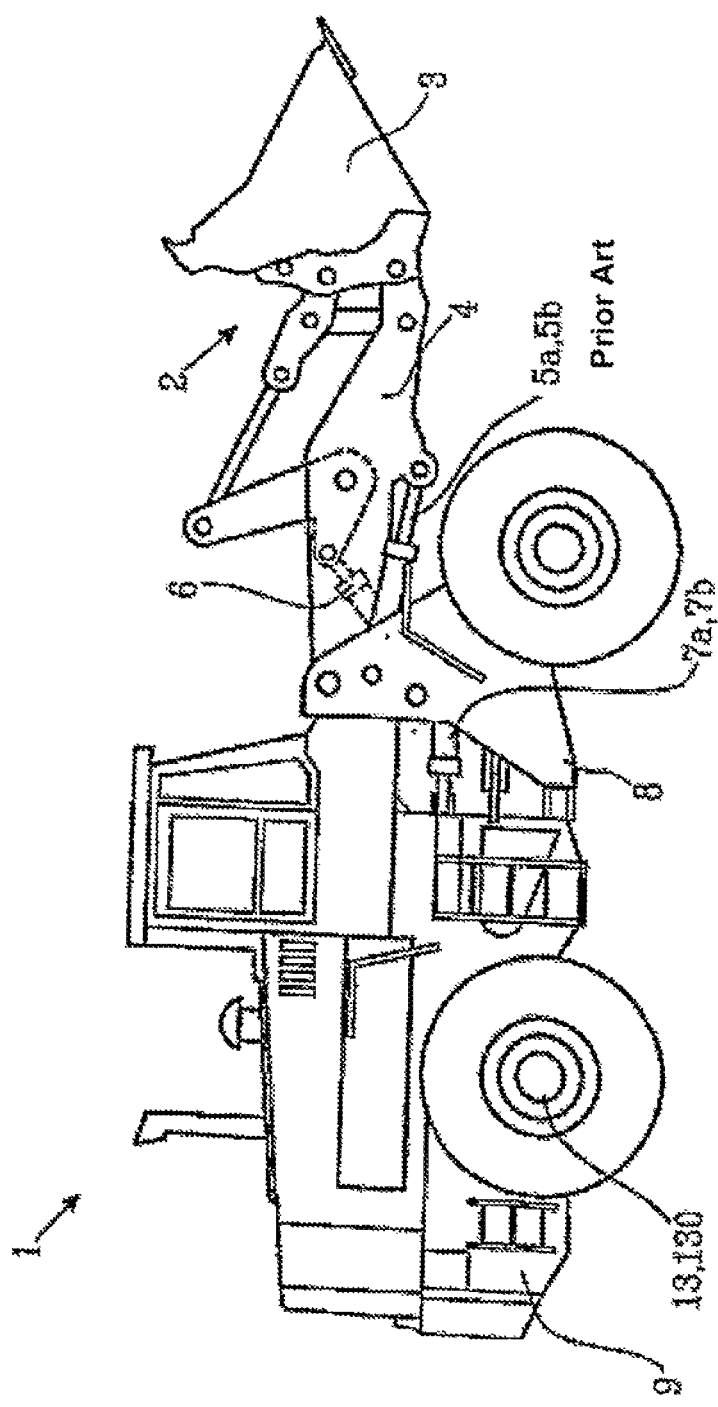
FIG. 1 is a lateral view illustrating a wheel loader having a bucket for loading operations, and a working hydraulic system for operating the bucket and steering the wheel loader.

FIG. 1 is an illustration of an exemplifying working machine in the form of a wheel loader 1 having an implement 2 in the form of a bucket 3. The bucket 3 is arranged on an arm unit 4 for lifting and lowering the bucket 3. The bucket 3 can also be tilted or pivoted relative to the arm unit 4. For this purpose the wheel loader 1 is provided with a working hydraulic system 140 comprising at least one hydraulic pump (not shown in FIG. 1) and working cylinders 5a, 5b, 6 for lifting and lowering of the arm unit 4, and for tilting or pivoting the bucket 3. In addition, the working hydraulic system comprises working cylinders 7a, 7b for turning the wheel loader 1 by means of relative movement of a front body 8 and a rear body 9. These features of the wheel loader 1 and variations thereof are well known to those skilled in the art and they need no further explanation.

A Hydraulic System

Figure 2:
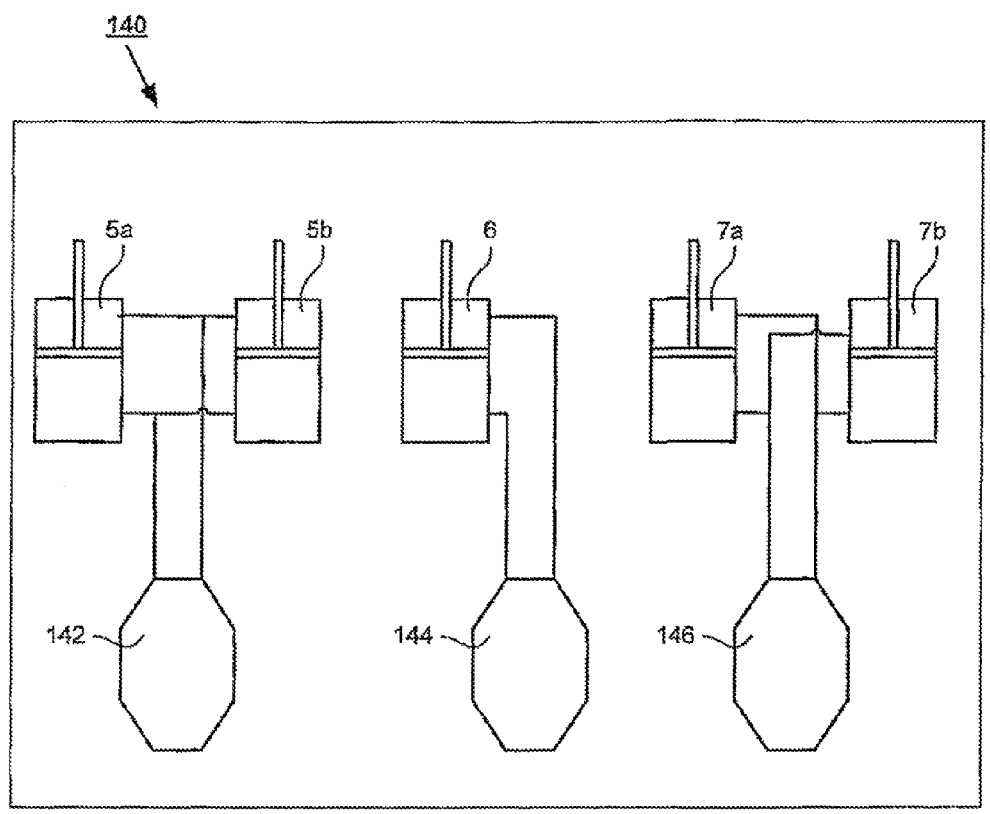
FIG. 2 is a schematic illustration of a working hydraulic system for a wheel loader.

FIG. 2 is a schematic illustration of an exemplifying working hydraulic system 140. The embodiment illustrated in FIG. 2 comprises two working cylinders known as lifting cylinders 5a, 5b. The lifting cylinders 5a, 5b are arranged for lifting and lowering the arm unit 4. A further working cylinder known as tilting cylinder 6 is arranged for tilting-in or tilting-out the bucket 3 relative to the arm unit 4. In addition, two working cylinders known as the steering cylinders 7a, 7b are arranged for steering the wheel loader 1. Three hydraulic pumps 142, 144, 146 supply the hydraulic cylinders with hydraulic oil. More specifically, a separate pump is provided for supplying oil to the hydraulic cylinder(s) of each function (lifting, tilting, steering) via a separate circuit. An operator of the wheel loader 1 can control the working cylinders by means of instruments connected to a control unit (not shown). Preferably the cylinders 5a, 5b, 6, 7a and 7b schematically illustrated in FIG. 2 correspond the cylinders 5a, 5b, 6, 7a and 7b shown in FIG. 1.

A Transmission Line

Figure 3:
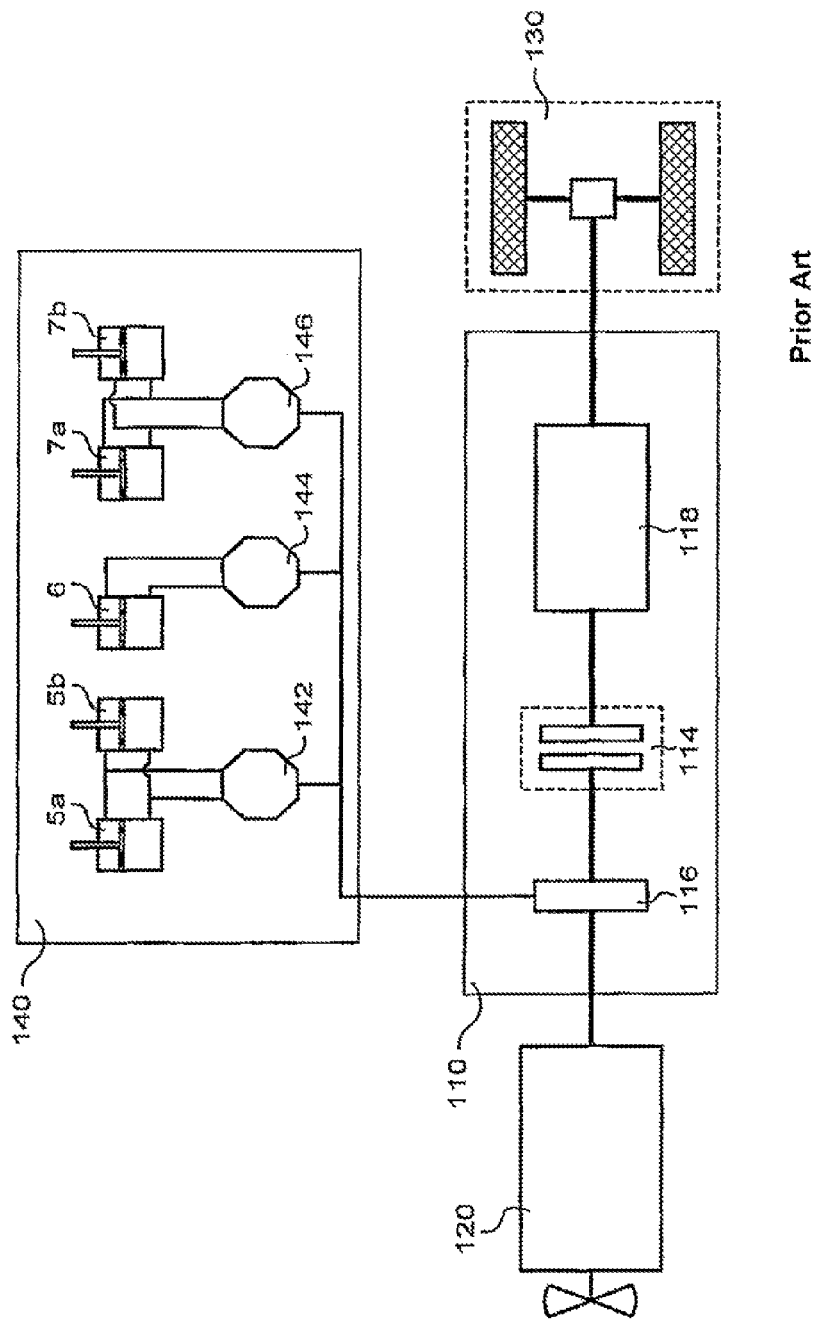
FIG. 3 is a schematic illustration of I.a. a transmission line of a wheel loader according to an embodiment of the present invention.

FIG. 3 is a schematic illustration of I.a. a transmission line 110 of a wheel loader 1 according to an embodiment of the present invention. A power source in the form of an internal combustion engine 120 is arranged at one end of the transmission line 110 and the driving wheels 130 of the wheel loader 1 are arranged at the other end of the transmission line 110. In other words, the internal combustion engine 120 is arranged to supply torque to the driving wheels 130 via the transmission line 110. Preferably the transmission line 110 comprises a gearbox 118 for varying the speed of the driving wheels 130 of the wheel loader 1 and for changing between forward and backward driving direction of the wheels 130. The gearbox 118 may e.g. be an automatic gearbox implying that there must not necessarily be a clutch (not shown) between the gearbox 118 and the driving wheels 130, which is common in case of a manual gearbox.

The transmission line 110 is further provided with a transmission unit 114 for reducing the mechanical interaction between the internal combustion engine 120 and the driving wheels 130, i.e. for providing slipping or skidding or even for temporarily disengaging the combustion engine 120 from the driving wheels 130. The main purpose is to protect the engine 120 from sudden rapid changes in the working conditions of the gearbox 118 and the driving wheels 130. The transmission unit 114 is preferably a hydraulic clutch of the type called hydrodynamic torque converter. As is well known, a torque converter is 5 adapted to increase the input torque applied to the converter. The output torque can be in the interval of e.g. 1-3 times the input torque. The torque converter may also have a free wheel function and/or a lock-up function providing a direct operation without any increased torque. In case of a lock-up function it is preferred that the lock-up state provides a fixed transmission ratio of substantially 1:1. Naturally, other types of transmission units are conceivable for providing a reduced mechanical interaction between the combustion engine 120 and the driving wheels 130, e.g. a skid clutch without any torque-increasing ability. The exact position of the transmission unit 114 within the transmission line 110 is not decisive. However, it is preferred that the transmission unit 114 is positioned after (i.e. downstream) the combustion engine 120 and before (i.e. upstream) the gearbox 118.

In addition, the transmission line 110 is provided with a power transferring unit 116 for driving the hydraulic pumps 142, 144, 146 of the hydraulic system 140 to enable the lifting, tilting and steering operations mentioned above. The power transferring unit 116 may e.g. be gear wheels or some other suitable power transferring means arranged to interact with the transmission line 110 for transferring power from the combustion engine 120 to the hydraulic pumps 142, 144, 146. The power transferring means 116 is preferably arranged to interact with the transmission line 110 in a position upstream the gear box 118 and more preferably in a position between the internal combustion engine 120 and the transmission unit 114. In other words, the power transferring unit 116 forms a branching-off portion for the division of the power from the power source 120 to the power consuming systems in the form of the transmission line 110 and the hydraulic system 140.

It should be added that the combustion engine 120 can be replaced by other power sources, e.g. a power source in the form of a gas turbine or even a fuel cell arrangement.

In addition, the transmission line 110 may be fully or at least partly replaced by a hydraulic transmission or an electric transmission. An electric transmission may e.g. be implemented by means of cables or similar that supplies power from an electric power source to one or several electric motors for operatively propelling the driving wheels 130. Likewise, the power transferring unit 116 may be fully or at least partly replaced by another power transferring unit based on hydraulic or electric principles. For example, the hydraulic pumps 142, 144, 146 may be powered by means of electric motors receiving power from the combustion engine 120 via a generator arrangement or similar.

Power Exchange and a Torque-Control Unit

Figure 4:
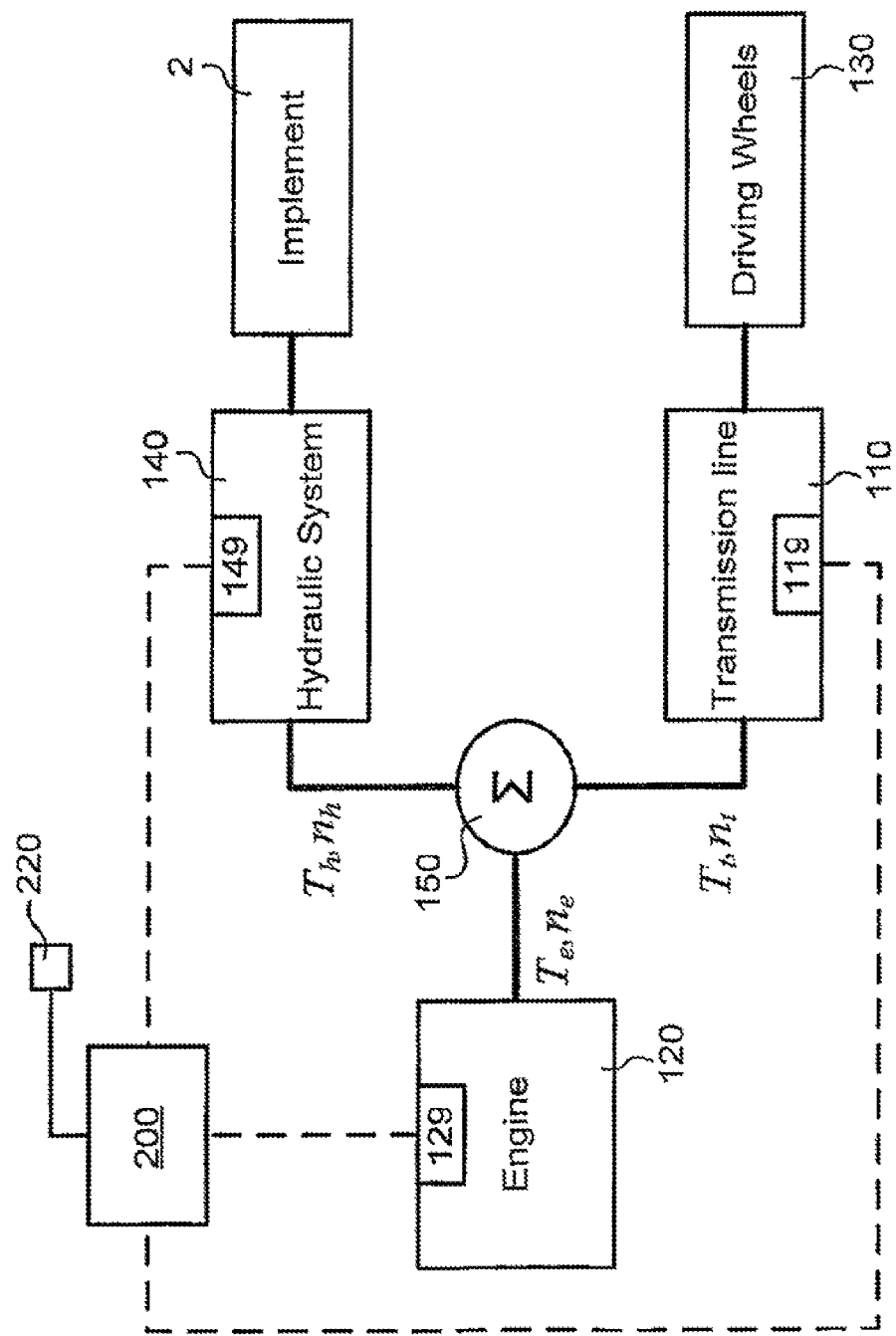
FIG. 4 is a schematic block diagram which schematically illustrates the power exchange between the units of a wheel loader as illustrated in FIG. 3.

The attention is now directed to FIG. 4, which is a schematic block diagram of the power exchange between the transmission line 110, the internal combustion engine 120 and the working hydraulic system 140 of the wheel loader 1 as previously described with 10 reference to FIG. 1-3. The transmission line 110 is at least connected to the driving wheels 130 of the wheel loader whereas the working hydraulic system 140 is at least connected to an implement 2.

As can be seen in FIG. 4 the transmission line 110, the internal combustion engine 120 15 and the hydraulic system 140 are connected to a torque-control unit 200 or a similar control unit being arranged to operatively control the power/torque exchanged between the transmission line 110, the internal combustion engine 120 and the hydraulic system 140. The torque-control unit 200 is preferably implemented as one or several hardware units arranged at one or several locations within the wheel loader 1 and provided with the appropriate circuitry and software needed to accomplish the required functions, e.g. circuitry for processing and storing; and software for executing and controlling any required processing and storing. In particular, it is preferred that the torque-control unit 200 is provided with substantial processing capabilities and advanced functions for controlling the power/torque exchanged between the transmission line 110, the internal combustion engine 120 and the hydraulic system 140 depending on algorithms or similar working on data received from control units and/or sensors or similar arranged within the wheel loader 1.

It is preferred that the torque-control unit 200 is connected to the sub-units 110, 120, 140 by means of a CAN-bus or possibly to a MOST-network or any other communication means that is used for connecting various units within the wheel loader 1. This is schematically illustrated in FIG. 4 by means of dashed lines connecting the sub-units 110, 120, 140. In fact, the torque-control unit 200 is preferably connected to the sub-units 110, 120, 140 via control-units and/or sensors or similar being arranged in the sub-units 110, 120, 140 for operatively monitoring the operation of the same.

Hence, the torque-control unit 200 is preferably connected to the combustion engine 120 5 by means of an engine ECU 129 (Electronic Control Unit, ECU) or similar. There are a wide variety of well known engine ECUs that are frequently used by those skilled in the art for controlling combustion engines, e.g. for monitoring and controlling such parameters as the torque and rotational speed provided by the engine. These well known ECUs need no further description.

Similarly, the torque-control unit 200 is preferably connected to the transmission line 110 by means of a transmission line ECU 119 for controlling for example the gear box 118. The ECU 119 is connected to sensors or similar being arranged for monitoring and controlling the operation of the transmission line 110. The sensors may e.g. be sensors for measuring torque and rotational speed in connection with the transmission line 110. The transmission line ECU 119 may also comprise or be connected to a brake ECU, e.g. in the form of an ECU for an ABS (Anti-Locking Brake System, ABS).

Likewise, the torque-control unit 200 is preferably connected to the hydraulic system 140 20 by means of a hydraulic system ECU 149 that comprises or is connected to sensors or similar being arranged for monitoring and controlling the operation of the hydraulic system 140. The sensors may e.g. be sensors for measuring the hydraulic pressure and flow provided by the hydraulic pumps 142, 144, 146 in the hydraulic system 140. Utilizing information from ECUs and/or sensors as mentioned above enables the torque control-unit 200 to monitor the current working condition of the sub-units 110, 120, 140 in the wheel loader 1 as will be discussed in more detail later.

In addition (or alternatively), instruments 220 for controlling the sub-systems 110, 120, 30 140 are typically arranged in the driving compartment of the wheel loader 1. The instruments are preferably connected to the torque-control unit 200 via a CAN-bus or possibly to a MOST-network or any other suitable communication means. This enables the torque-control unit 200 to monitor the commands given from the instruments to the sub-systems 110, 120, 140 and manipulate the signals. 35 The instruments 220 can e.g. be one or several joy-sticks or similar for controlling the hydraulic pumps 142 and 144 coupled to the lifting and tilting cylinders 5a, 5b and 6 as described above. The instrument 220 can also be a steering wheel or similar for controlling the pump 146 coupled to the steering cylinders 7a and 7b as described above. In addition, the instruments 220 may be a gas pedal for controlling the combustion engine 120 or a brake pedal for controlling the braking action of the wheel loader 1. Naturally, other instruments for controlling the sub-systems 110, 120, 140 are clearly conceivable.

Commands from the instruments 220 are preferably transferred to ECUs or similar being arranged to control the sub-systems 110, 120, 140. As indicated above, it is preferred that the commands are transferred via a CAN-bus or a MOST-network or any other suitable communication means to which the torque-control unit 200 is connected. For example, commands from a brake pedal to a brake ECU (e.g. an ABS Anti-Locking Brake System, ABS) affects the brakes acting on the driving wheels 130 of the of the wheel loader 1, which in turn affects the transmission line 110. Similarly, commands from a gas pedal to an engine ECU may affect fuel injecting and turbo charging systems, which in turn affects the combustion engine 120. Commands from a joy-stick or a steering wheel or similar to a hydraulic ECU may affect the hydraulic pumps 142, 144, 148 and/or possible valves in the hydraulic system 140, which in turn affects the hydraulic system 140 as a whole.

Knowing the current working condition of the sub-systems 110, 120, 140 and/or the commands given to the sub-systems 110, 120, 140 makes it possible to predict the change in the working condition for the sub-system 110, 120, 140, provided that the characteristic of the sub-systems 110, 120, 140 are known. Hence, it is preferred that the torque-control unit 200 is provided with suitable information about the characteristics of the transmission line 110, the internal combustion engine 120 and the hydraulic system 140. A prediction model is provided comprising characteristics in the form of implicit or explicit equations or look-up tables or any other theoretical or empirical obtained representation. This will be described in more detail later.

Power Exchange and a Summation Point

The schematic block diagram in FIG. 4 shows a summation point 150 to which the transmission line 110, the internal combustion engine 120 and the hydraulic system 140 of the wheel loader 1 are schematically connected. The summation point 150 represents the branching-off portion 116 between the engine 120 and the transmission line 110 and the hydraulic system 140. The branching-off portion is according to one example a mechanical flywheel to which the sub-systems 110, 5 120, 140 are mechanically coupled. This is illustrated in FIG. 4 by means of solid lines connecting the sub-systems 110, 120, 140. The summation point 150 is created or represented by calculations and/or estimations or similar performed by the torque-control unit 200 based on measurements or similar received from sensors and/or ECUs or similar being connected to or arranged in the sub-systems 110, 120 140.

In fact, almost every working machine comprises various torque providers and torque consumers that have to be balanced. The summation point 150 that is shown in FIG. 4 is such a point wherein torque providers and torque consumers of the wheel loader 1 can be advantageously balanced.

As long as the sub-systems 110, 120 140 are operating under static conditions the sum of the powers/torques added to and subtracted from the summation point 150 are equal to zero. A sum above zero results in an increased rotational speed for the combustion engine 120 and a sum below zero results in a reduced rotational speed for the engine 120.

The powers added and subtracted to and from the summation point 150 can illustrated by the following relation:

$$P = T \cdot \omega \quad (1)$$

wherein
P is the power (W)
T is the torque (Nm)
ω is the angular speed (rad/s)

As is well known, the angular speed ω (rad/s) correspond to the rotational speed n (rpm) multiplied by a constant. The powers/torques with respect to the sub-systems 110, 120, 140 in FIG. 4 are represented by torques and rotational speeds as follows:

Te is the torque currently provided by the combustion engine 120,
ne is the rotational currently speed provided by the combustion engine 120,
Th is the torque currently required by the working hydraulic system 140,
nh is the rotational speed currently required by the working hydraulic system 140,
Tt is the torque currently required by the transmission line 110,
nt is the rotational speed currently required by the transmission line 110.

The most common case is probably a summation point 150 representing a mechanical flywheel or similar to which the sub-systems 110, 120, 140 are mechanically coupled. Here the rotational speeds for the different sub-systems 110, 120, 140 have a fixed relationship with respect to each other. The sub-systems 110, 120, 140 may even have the same rotational speed n. Hence, during operation under static conditions in this case the sum of all torques added to and subtracted from the summation point 150 is equal to zero. A sum above zero results in an increased rotational speed for the combustion engine 120 and a sum below zero results in a reduced rotational speed for the engine 120.

Function of Preferred Embodiments

Above we have discussed the structure of preferred embodiments implemented in a working machine in the form of an exemplifying wheel loader 1. The exemplifying wheel loader 1 comprises La. a transmission line 110, an internal combustion engine 120 and a working hydraulic system 140.

Figure 8:
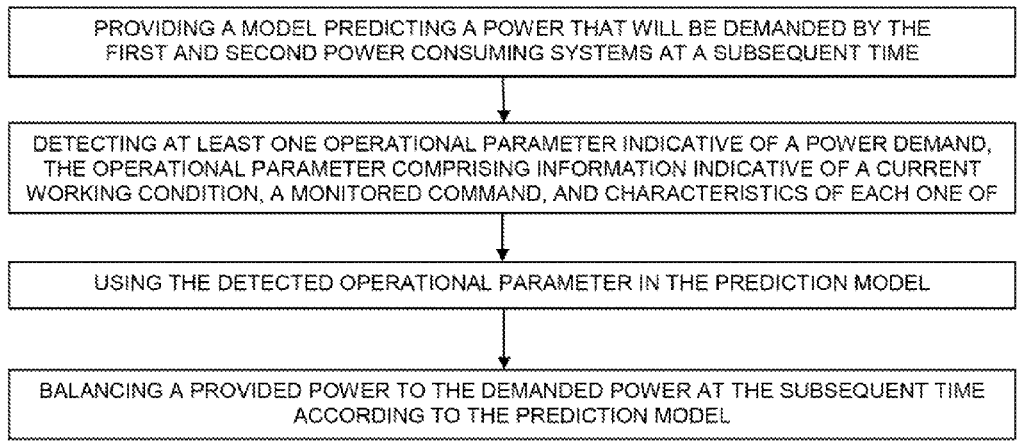
FIG. 8 is a flow chart illustrating steps in a method according to an aspect of the present invention.

By monitoring the current working conditions for the sub-systems 110, 120, 140 and by monitoring the commands given to the sub-systems 110, 120, 140 it is possible to predict any change in the current working conditions, provided that the characteristics of the subsystems are known. This will be described in more detail below. FIG. 8 shows steps in a method for operating a working machine according to an aspect of the present invention.

Monitoring the Current Working Conditions

The current working condition for the transmission line 110 can be obtained by e.g. measuring the torque Tt and the rotational speed nt mentioned above with reference to FIG. 4. This can be accomplished by means of torque sensors and sensors for measuring rotational speed or similar. However, in an alternative embodiment at least some of the variables needed to obtain the current working condition for the transmission line 110 may be estimated and/or calculated based on knowledge about the current operation of units comprised by the transmission line 110, e.g. the current operation of the transmission unit 114.

The current working condition for the combustion engine 120 can be obtained by e.g. measuring the torque Te and the rotational speed ne mentioned above with reference to FIG. 4. However, in an alternative embodiment at least some of the variables needed to 15 obtain the current working condition for the engine 120 may be estimated and/or calculated based on knowledge about the current operation of the fuel injection arrangement and/or the turbo charger of the combustion engine 120 etc. Such knowledge can typically be obtained from the engine ECU 129 mentioned above. The current working condition for the working hydraulic system 140 can be obtained by e.g. measuring the torque Th and the rotational speed np mentioned above with reference to FIG. 4. It is then assumed that the transmission line 110 is provided with a rotational power transferring means 116 for driving the hydraulic pumps 142, 144, 146 of the hydraulic system 140 or at least that the hydraulic pumps 142, 144, 146 are provided with rotational shafts or similar having torques and rotational speeds that can be measured. However, if this is not so the current working condition for the hydraulic system 140 can be alternatively obtained by e.g. measuring the hydraulic pressure and flow provided by the hydraulic pumps 142, 144, 146. This follows from the fact that the power produced by an ordinary hydraulic pump is closely related to the pressure and flow produced by that pump. In addition, the working condition for the hydraulic system 140 may be obtained by measuring the pressure and rotational speed for the pumps 142, 144, 146 and estimating the flow or displacement for the pumps 142, 144, 146. However, in an alternative embodiment at least some of the variables needed to obtain the current working condition for the working hydraulic system 140 may be calculated and/or estimated.

Monitoring the Commands

A command from an operator to an ordinary mechanical system such as the sub-systems 110, 120, 140 is always executed with some delay. The delay may e.g. be caused by the 5 transmission of the command, by the execution of the command through mechanical parts and other units in the sub-system and by the natural inertia and similar in the sub-systems etc. Hence, by monitoring the commands from an operator of the wheel loader 140 to the sub-systems 110, 120, 140 it is possible to predict a future working condition for the subsystems 110, 120, 140 before it can be actually measured by sensors in the sub-system 10 110, 120, 140. The commands now discussed are typically given by an operator of the wheel loader 1 utilizing various instruments arranged in the driving compartment of the wheel loader 1 as discussed above.

The Characteristics of the Sub-Systems—Predicting Working Conditions

We have now discussed the monitoring of the current working conditions for the subsystems 110, 120, 140 and the monitoring of the commands given to the sub-systems 110, 120, 140. To be able to predict any change in the current working conditions we will also need the characteristics of the sub-systems 110, 120, 140. This will be discussed in more detail below.

Figure 5:
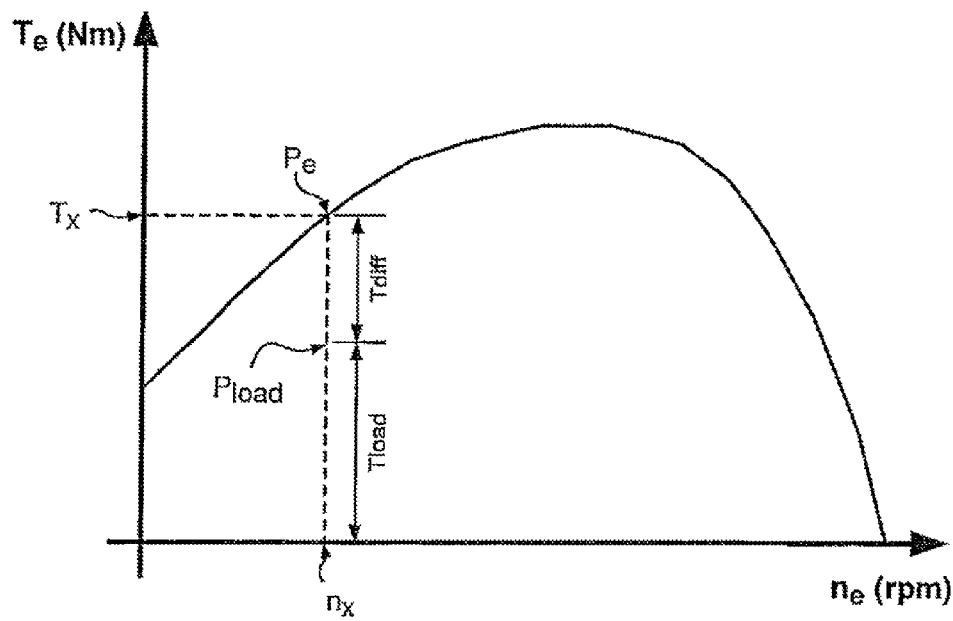
FIG. 5 is a diagram which schematically illustrates the torque produced at different rotation speeds for an exemplifying combustion engine.

The characteristics of the combustion engine 120 can e.g. be represented by the torque and the rotational speed produced by the engine 120. This is illustrated in FIG. 5 showing a diagram with a graph that schematically illustrates the torque Te (Nm) produced at different rotational speeds ne (rpm). The torque Te and the rotational speed ne correspond to the maximum available output power Pe from the combustion engine 120 at that particular rotational speed ne according to the general and well known relation P–Tω as given in relation (1) above, wherein the angular speed ω (rad/s) is the same as rotations per minute (rpm) multiplied by a constant.

For example, an operator of the wheel loader 1 may run the engine 120 at a rotational speed of nx (rpm) giving a maximum available output torque of Tx (Nm) and a currently available maximum output power Pe– However, the current load Pload <on> the engine 120 may only be a fraction of the maximum available output power Pe. i.e. the engine 120 is only providing the fraction Pload of the maximum output power Pe to the sub-systems 110 and 140. Naturally, the power Poad at the rotational speed nx (rpm) corresponds to a torque TOad that is provided by the engine 120. This enables the engine 120 to respond to an increased load within a load margin of Pdiff=Pe–Pload without having to increase 5 the rotational speed x (rpm). In other words, this enables the engine 120 to respond to an increased load within a load margin of Tdiff=Tx–Toad without having to increase the rotational speed nx (rpm) as illustrated in FIG. 5. If more power and torque is required this can be provided by increasing the rotational speed ne of the combustion engine 120. However, this can only be successfully done up to the maximum torque at the top of the graph in FIG. 5 after which the output torque from the combustion engine 120 declines. Usually an engine's maximum torque and maximum power can not be found at the same rotational speed. For most engines the rotational speed for maximum power output lies higher than the rotational speed for maximum torque. That means that even after the peak and subsequent decline of engine torque the engine power still increases until it peaks and thereafter declines, too.

From the above it follows that by monitoring the commands to the combustion engine 120 (i.e. typically the commands from a gas pedal to the engine ECU 129), which commands e.g. comprise the rotational speed ne or similar to be produced by the combustion engine 120, it will be possible to predict the maximum torque Te,pred and maximum power. Pe.pred that will be available from the engine 120 in the next instant. It should be added that the commands to the combustion engine (i.e. typically the commands from a gas pedal to the engine ECU 129) may alternatively comprise the torque Te or power Pe to be produced by the combustion engine 120.

The attention is now directed to the characteristic of the hydraulic system 140. This characteristic can e.g. be represented by the pressures and flows that are produced by the hydraulic pumps in the hydraulic system 140 at different rotational speeds. For an ordinary hydraulic pump this can e.g. be described by the following relations:

$$Tp = PpDp/(2\pi \eta hm) \quad (2)$$

$$Dp = Qp/(np\eta vol) \quad (3)$$

$$Pp = Tp \cdot np \quad (4)$$

wherein
Tp represents the input torque required by the pump
Pp represents the pressure generated by the pump
Dp represents the displacement generated by the pump
ηhm represents the hydromechanical efficiency
Qp represents the flow generated by the pump
np represents the rotational speed for the pump
ηvol represents the volumetric efficiency
Pp represents the power required by the pump It follows that an increased load on the hydraulic system 140 comprising the pumps 142, 144, 148 will require an increased pressure pp and/or that an increased flow demand will require an increased displacement Dp for at least one of the pumps 142, 144, 148. Both in turn require an increased input torque Tp to the pump in question and/or an increased rotational speed ηp, i.e. an increased input power Pp. The hydromechanical efficiency ηhm and the volumetric efficiency ηvol for the pump in question are mainly dependent on pressure, rotational speed and displacement (but also on oil viscosity, temperature etc) and they can e.g. be represented by a look-up table stored in the torque-control unit 200.

Hence, by monitoring the commands to the pumps 142, 144, 148, which commands directly or indirectly comprise e.g. at least one of the variables pressure pp, displacement Dp or flow Qp to be produced by the pump in question, it will be possible to predict the power Ph.pred and/or the torque Tn,pred required by the hydraulic system 140. It will also be possible to predict the rotational speed ηh,pred required by the hydraulic system 140 in case the transmission line 110 is provided with a rotational power transferring means 116 or similar for driving the hydraulic pumps 142, 144, 146.

The attention is now directed to the characteristic of the transmission line 110. This characteristic can e.g. be represented by the characteristic of the transmission unit 114 arranged therein. An exemplifying table representing the characteristics of the transmission unit 114 may e.g. comprise the following variables:
Tin represents the input torque to the transmission unit
nin represents the input rotational speed to the transmission unit
Tout represents the output torque from the transmission unit
nout represents the output rotational speed from the transmission unit This illustrates that a certain torque Tin and a certain rotational speed njn being inputted to the transmission unit 114 correspond to a certain torque Tout and a certain rotational speed nout being outputted from the soft transmission unit 114. Such a table can comprise all relevant load cases for a certain transmission unit, e.g. measured in laboratory conditions and/or sampled in real life use.

Alternatively or additionally, the characteristic of the transmission unit 114 can be represented by means of one or several mathematical expressions or similar. For example, a simplified model is given by the two mathematical relations below. The model is commonly used to describe the characteristic of a transmission unit in the form of a hydrodynamic torque converter. Naturally, depending on the nature of the transmission unit there are clearly other mathematical relations or expressions or similar that can be used to describe the characteristic of a particular transmission unit.

The simplified model mentioned above is based on two simple relations.

$$T_{in} = k(v) n^2_{in}, \text{ where } k(v) = T_{in,ref}(v) \quad (6)$$

$$n^2_{in,ref}$$

$$T_{out} = \mu(v) T_{in} \quad (7)$$

wherein
Tin represents the input torque
Tin,ref represents the input torque at a determined reference input rotational speed
Tout represents the available output torque
nin represents the input rotational speed
nin,ref represents a determined reference input rotational speed
k(v) represents the absorption factor for the converter in question at different input and output rotational speeds
μ(v) represents the amplifying factor for the converter in question at different input and output rotational speeds
v represents the input rotational speed njn divided by the output rotational speed nout–

Values for the factors k(v) and μ(v) with respect to a certain torque converter can be obtained by running the converter at a reference input rotational speed nin,ref (e.g. at 1000 rpm) while the output rotational speed is varied. The simplified converter model described by the relations 6, 7 above and the manner of obtaining the factors k(v) and μ(v) are well known to those skilled in the art and they need no further explanation.

It follows that in case the transmission unit 114 is implemented as a hydrodynamic torque converter it is possible to calculate the available output torque Tout from the transmission unit 114 by measuring the input rotational speed njn and by knowing the two factors k(v) and μ(v). Naturally, the same or similar can be accomplished for a general transmission unit 114 by means of searching in a look-up table describing the characteristic of the transmission unit 114 as mentioned above.

Now, by monitoring the commands to units and systems that affect the working condition of the transmission line 110 it will be possible to predict the output torque and the output rotational speed that will be required from the transmission unit 114 in the next instant. Using the characteristic for the transmission unit 114 as describe above it is then possible to predict the torque Tpred and the rotational speed nt,pred that will be required by the transmission unit 114 and the transmission line 110 from the combustion engine 120 in the next instant, i.e. it will be possible to predict the power Pt.pred that will be required from the combustion engine 120 in the next instant.

In particular it is preferred to monitoring the commands from a brake pedal to a brake ECU (e.g. to an Anti-Locking Brake System, ABS), which commands comprise the magnitude of the braking torque or similar to be imposed on the driving wheels 130 and hence on the transmission line 110. However, the torque-control unit 200 may need a look-up table or similar for converting the command to the brake ECU so that the command corresponds to the torque or similar that will be imposed on the transmission line 110 in the next instant. Such a table can e.g. be obtained by empiric tests in laboratory environments or by measurements during real-life driving or similar.

Response to a Rapid Increase of the Load on the Sub-Systems

Above we have discussed the current working conditions for the sub-systems 110, 120, 140 and the commands given to the sub-systems 110, 120, 140. We have also discussed the prediction of any change in the working conditions based on the current working conditions, the monitored commands and the characteristics of the sub-systems 110, 120, 140.

As will be discussed in more detail below, a prediction with respect to the summation point 150 makes it possible to balance torque providers and torque consumers to meet a sudden rapid increase of the load on the sub-systems 110, 120, 140 in a more proactive and flexible manner.

As mentioned before, as long as the sub-systems 110, 120, 140 are operating under static conditions the sum of the powers added to and subtracted from the summation point 150 are equal to zero. In other words, under static conditions we have:

$$P\text{load} + Pt + Ph = 0 \quad (8)$$

If the sub-systems 110, 120, 140 are connected to a summation point 150 representing a flywheel which causes the sub-systems to operate at the same rotational speed we have:

$$T\text{load} + Tt + Th = 0 \quad (9)$$

Now, if the predicted load (Pload,pred=Pt,pred+Ph.pred) on the combustion engine 120 exceeds the power Pe.pred predicted to be available from the engine 120 we will have a situation wherein the sum of the powers in the summation point 150 is below zero, which can be represented by the following relation:

$$Pe.\text{pred} + Pt.\text{pred} + Ph.\text{pred} < 0 \quad (10)$$

If the sub-systems 110, 120, 140 are connected to a summation point 150 representing a flywheel which causes the sub-systems to operate at the same rotational speed we have:

$$Te.\text{pred} + Tt.\text{pred} + Th.\text{pred} < 0 \quad (11)$$

As previously described:
Te is the torque currently available from the combustion engine 120,
Tload is the fraction of Te that is currently provided by the combustion engine 120,
Th is the torque currently required by the working hydraulic system 140,
Tt is the torque currently required by the transmission line 110,
Pe is the power currently available from the combustion engine 120,
Pload is the fraction of Pe that is currently provided by the combustion engine 120,
Ph is the power currently required by the working hydraulic system 140,
Pt is the power currently required by the transmission line 110,
Te.pred is the torque predicted to be available from the combustion engine 120,
Th,pred is the torque predicted to be required by the working hydraulic system 140,
Tt.pred is the torque predicted to be required by the transmission line 110, Pe.pred is the power predicted to be available from the combustion engine 120, Ph.pred is the power predicted to be required by the working hydraulic system 140, Pt.pred is the power predicted to be required by the transmission line 110, In a situation where the predicted load (Poad,pred=Pt.pred+Ph,pred) on the combustion engine 120 exceeds the power Pe.pred predicted to be available from the combustion engine 120, as illustrated by the relations 10 and 11 above, we will receive a reduced rotational speed ne for the combustion engine 120 and there is a clear risk of overloading and potentially stalling the engine 120. Naturally, the same is valid mutatis mutandis for the predicted torgt/es Te,pred. Tt,pred and Th,pred.

To remedy the risk of overloading and potentially stalling the engine 120 it is preferred that the rotational speed ne for the combustion engine 120 is increased as soon as it is detected that a predicted load (Pt.pred+Ph.pred) on the combustion engine 120 will exceed the predicted power (Pe.pred) that will be available from the engine 120. This can e.g. be achieved by the torque-control unit 200 transmitting a message via a CAN-bus to an engine ECU or similar unit for controlling the combustion engine 120 in the wheel loader 1 so as to increase the rotational speed of the engine 120.

However, it is more preferred that the rotational speed ne for the combustion engine 120 is increased as soon as it is detected that a predicted load increase on the combustion engine 120 will exceed or become equal to the current load margin Pdiff=Pe−Pload. which has been discussed above with reference to FIG. 5.

This can e.g. be expressed by the following relation:

$$(Pt.\text{pred}+Ph.\text{pred})-(Pt+Ph) \geq P\text{diff} \tag{11}$$

It is even more preferred that the rotational speed ne for the combustion engine 120 is increased as soon as it is detected that the predicted load increase on the combustion engine 120 will exceed a percentage of the current load margin Pdiff, e.g. a percentage in the interval of about 50%-90% of the current load margin Pdiff. This is to ensure that there is still a sufficient margin for an additional increase of the load on the combustion engine 120 caused by other systems within the wheel loader 1.

However, to avoid conflicts with increasingly harder emission regulations, particularly with respect to exhaustion gases and visible smoke emanating from the combustion engine 120 in response to an increase of the load on the engine 120, it is preferred that the rotational speed ne for the engine 120 is increased in a controlled manner when responding to an increased load. In particular it is preferred that the rotational speed ne is increased to the required level over a period that can be extended if necessary.

A controlled increase of the rotational speed ne for the combustion engine 120 in the exemplifying wheel loader 1 can e.g. be accomplished by temporarily decreasing the displacement Dp for the pumps 142, 144, 148 in the working hydraulic system 140. The displacement Dp can e.g. directly be adjusted by means of electric step motors, hydraulic pistons or similar, or indirectly e.g. by hydraulic valves that are arranged to reduce the load-sensing signal flow of hydraulic fluid to the pumps 142, 144, 148.

This creates a temporary reduction of the power required by the pumps 142, 144, 148 in the hydraulic system 140 and hence a temporary reduction of the power required by the combustion engine 120. The combustion engine 120 is hereby given an extended period to reach the required rotational speed.

Additional Embodiments

An Auxiliary Power Source

Accomplishing a controlled increase of the rotational speed for the combustion engine 120 by temporarily decreasing the displacement Dp for the pumps 142, 144, 148 in the working hydraulic system 140 as suggested above suffers from the drawback that an operator of the wheel loader 1 will experience a hydraulic system 140 with a reduced performance.

Hence, in another embodiment of the invention a controlled increase of the rotational speed ne for the combustion engine 120 is achieved by creating an extended period for the engine 120 to reach the required rotational speed by utilizing an auxiliary power source in the form of an electric machine 112. This avoids the drawbacks of having to reduce the performance of the any of the sub-systems 110, 120, 140 as will be clear from the description below.

Figure 6:
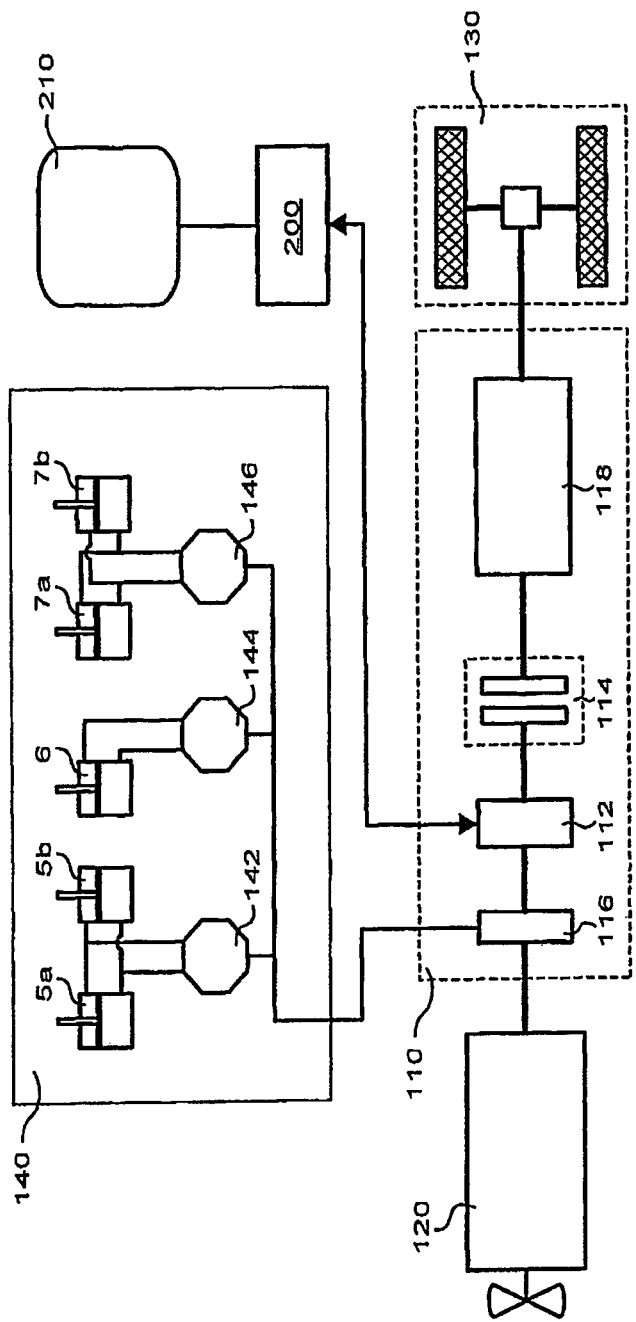
FIG. 6 is a schematic illustration of I.a. a transmission line of a wheel loader according to another embodiment of the present invention.

FIG. 6 shows the transmission line 110 provided with at least one electric machine 112. The electric machine 112 is arranged to operatively add torque to the transmission line 110 in a suitable position downstream the combustion engine 120. Preferably the electric machine 112 is arranged in a position between the internal combustion engine 120 and the transmission unit 114. The electric machine 112 should be able to operate in at least one quadrant, i.e. as motor in at least one direction of rotation. The electric machine 112 is coupled to the transmission line 110 so that torque can be exchanged between the transmission line 110 and the electric machine 112. This can be achieved by a plurality of means and functions which are well known to those skilled in the art, e.g. by a mechanic coupling of one or several shafts in the transmission line 110 to the output shaft of the electric machine 112.

Figure 7:
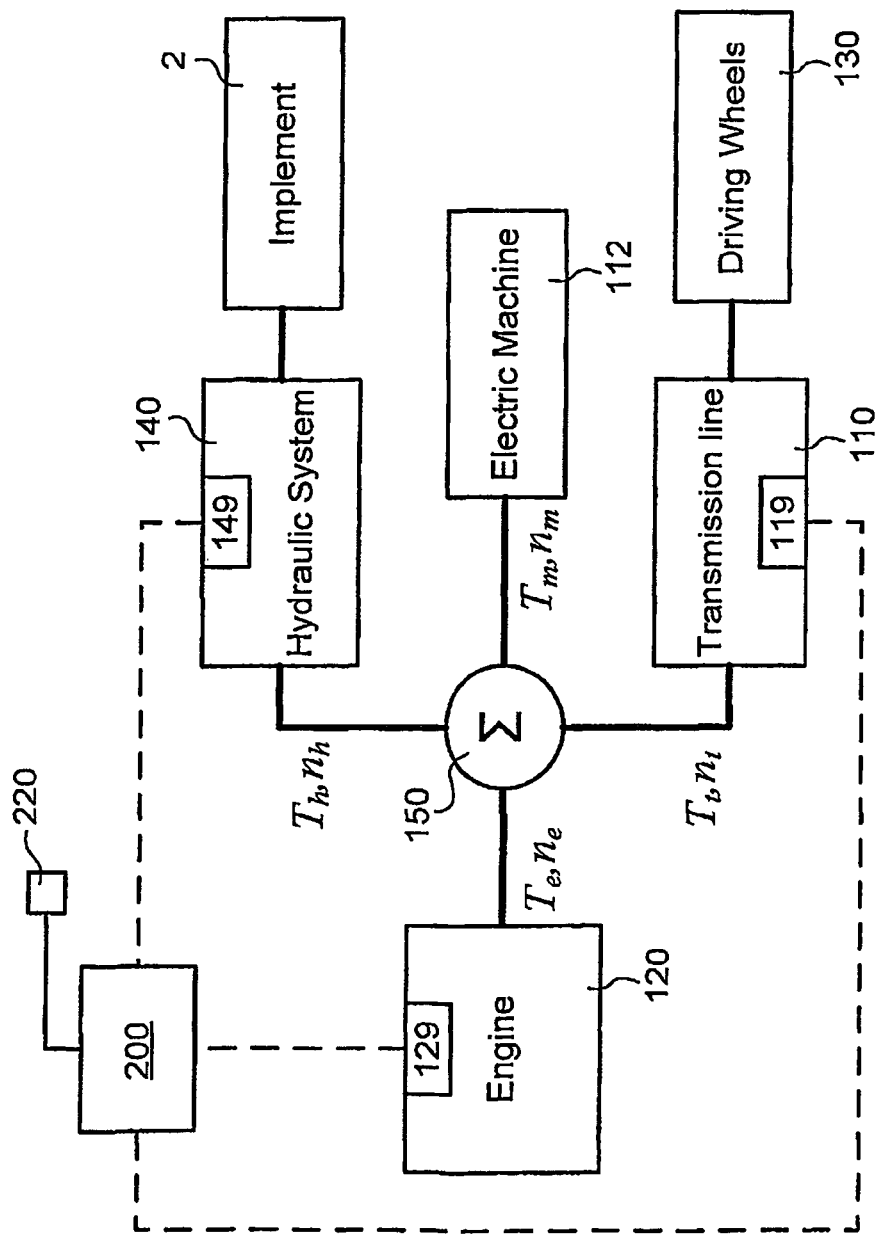
FIG. 7 is a schematic block diagram which illustrates the power exchange between the units of a wheel loader as illustrated in FIG. 6.

FIG. 7 is a schematic block diagram which schematically illustrates the power exchange between the units of a wheel loader as illustrated in FIG. 6.

It is preferred that the electric machine 112 is connected to the torque-control unit 200 being arranged to operatively control the torque exchanged between the transmission line 110 and the electric machine 112. The torque-control unit 200 is preferably arranged to operatively provide the machine 112 with electric power from an electric power source 210. This enables the torque-control unit 200 to operate the electric machine 112 as a motor which adds torque to the transmission line 110 for reducing the load on the combustion engine 120.

The electric power source 210 can be designed in many different ways, as long as it is able to provide electricity to the electric machine 112. One alternative is to use a generator powered by a separate combustion engine or similar. However, it is more preferred to use a battery or a super capacitor or even fuel cells and similar alternatives that operate without any separate combustion engine or similar. Here it should be added that the electric machine 112 can be arranged to work as a generator for charging the electric power source 210 when the general load on the combustion engine so permits. Naturally, the charging function of the electric machine 112 is provided in addition to the other functions described herein.

In one embodiment of the invention the electric machine 112 is operated by the torque-control unit 200 to add a predetermined amount of torque to the transmission line 110 to reduce the load on the combustion engine 120. The predetermined amount may e.g. be the maximum power of the electric machine 112 or a predetermined fraction of that power. This is similar or equal to an all-or-nothing function or an on/off function. The simplicity of this function is a clear advantage. However, a drawback is that the added amount of torque has no significant correlation with the load on the combustion engine 120. Hence, the added amount of torque may be too small or too large. A small amount may give an insufficient support for the combustion engine 120. A large amount may disturb other functions in the wheel loader 1. Hence, in another embodiment of the invention it is preferred that the electric machine 112 is operated by the torque-control unit 200 to add an amount of torque to the transmission line 110 so that the predicted increase of the load on the combustion engine 120 will be neutralized or at least substantially neutralized. This can be accomplished by adding an amount of power that equals or correspond to the predicted increase of the load on the engine 120. In one embodiment this is achieved by adding an amount of power that equals or correspond to the first time derivative of the load on the engine 120. Alternatively, this may be accomplished by adding an amount of power that equals or correspond to the rate of the increase of the load on the engine 120. In one embodiment this is achieved by adding an amount of power that equals or correspond to the second time derivative of the load on the engine 120.

However, the amount of torque that is added to the transmission line 110 by the electric machine 112 in the embodiments described above is based on a value that is essentially depending on the increase of the load on the combustion engine 120. In other words, the added torque has no significant correlation with the current working point of the combustion engine 120.

Hence, given a current working point for the combustion engine 120 at a rotational speed of x (rpm) providing an available output torque of x (Nm) and an available output power Pe from the combustion engine 120, as discussed above with reference to FIG. 5. Then the amount of torque added to the transmission line 110 should be of such an amount so that the predicted increase of the load on the combustion engine 120 is not exceeding the current load margin Pdjff. Alternatively, the amount of torque added to the transmission line 110 should be of such an amount so that the predicted increase of the load on the engine 120 does not exceed a predetermined percentage of the current load margin Pdjff, e.g. a percentage in the interval of about 50%-80% of the current load margin Pdiff.

In addition, the torque-control unit 200 is preferably arranged to reduce the amount of torque that is added to the transmission line 110 by the electric machine 112 when the rotational speed of the combustion engine 120 is increased in a controlled manner to meet the predicted increase of the load on the engine 120, since an increased rotational speed for the engine 120 leads to an increased margin with respect to engine overload and possible stall etc. Further Hydraulic Features and Alternative Implements Although the exemplifying hydraulic system 140 illustrated in FIG. 2-3 has three hydraulic pumps 142, 144, 146 other embodiments may have one, two, four or more hydraulic pumps. In a preferred embodiment of the invention the working machine has at least two implement and/or steering functions, and at least one said hydraulic pump is arranged for each implement and/or steering function.

As described in connection to the FIG. 1, the working machine 1 can have an implement 2 in the form of a bucket 3 which is operated by means of the hydraulic system 140. However, it should be emphasised that other implements are usable. When applying the invention on a working machine such as an articulated hauler or a truck, the implement can instead be for example a dump body. Usually a hydraulic pump and working cylinders are used for the operation of the dump body during the dumping movement.

It is to be understood that the present invention is not limited to the embodiments described above and illustrated in the drawings; rather, the skilled person will recognize that many changes and modifications may be made within the scope of the appended claims.

The invention claimed is:

1. A method for operating a working machine provided with: a power source providing power and a plurality of power consuming systems connected to the power source, wherein a first power consuming system is a hydraulic system of the working machine and a second power consuming system is a transmission line of the working machine, comprising providing a model predicting a power that will be demanded by the first and second power consuming systems at a subsequent time, detecting operational parameters indicative of the demanded power, the operational parameters comprising information indicative of a current working condition, a monitored command, and characteristics of each one of the first and second power consuming systems, using the detected operational parameters in the prediction model, and balancing a provided power to the demanded power at the subsequent time according to the prediction model, wherein the detected operational parameters indicative of the demanded power are at least indicative of a current working condition of the power source that is detected by measuring a rotational speed and measuring or estimating a torque.

2. A method according to claim 1, comprising performing the balancing of the provided power to the demanded power so that a load on the power source is reduced.

3. A method according to claim 1, wherein the detected operational parameters indicative of the demanded power are indicative of a further working condition that is detected by measuring a hydraulic pressure and measuring or estimating a flow provided by a hydraulic pump in the first power consuming system.

4. A method according to claim 1, comprising detecting the at least one operational parameter indicative of the power demand by detecting at least one input command from a working machine operator.

5. A method according to claim 1, wherein the power consuming systems are connected to the power source via a branching-off portion, and that the prediction model comprises a power summation point, which represents the branching off portion.

6. A method according to claim 5, comprising performing the balancing of the provided power to the demanded power when the prediction model indicates that the power balance between the power source and the power consuming systems is or will be below zero in the summation point.

7. A method according to claim 6, comprising adjusting the balancing of the provided power to the demanded power until the prediction model indicates a balance condition in which the power is zero or above zero the summation point.

8. A method according to claim 1, wherein the prediction model is adapted to predict a total power demanded by all of the power consuming systems.

9. A method according to claim 1, wherein the prediction model is adapted to predict an individual power demand of each of the power consuming system.

10. A method according to claim 1, wherein the prediction model comprises a first portion, which is characteristic of a behaviour of the power source.

11. A method according to claim 1, comprising performing the balancing of the provided power to the demanded power by adding torque by means of an external power source.

12. A method according to claim 11, comprising adding the torque to the second power consuming system.

13. A method according to claim 1, comprising performing the balancing of the provided power to the demanded power by effecting the power source and/or at least one of the power consuming systems in case an adjustment with regard to power is determined to be needed.

14. A method according to claim 1, comprising performing the balancing of the provided power to the demanded power by reducing an actual power provided to at least one of the power consuming systems relative to a demanded power.

15. A method according to claim 1, wherein the operational parameter indicative of the power demand is indicative of a demanded power of the plurality of power consuming systems.

16. A method according to claim 1, wherein the hydraulic system comprises at least one hydraulic pump powered by the power source for moving an implement on the working machine and/or for steering the working machine.

17. A method according to claim 16, comprising adjusting the balancing of the provided power to the demanded power by temporarily decreasing the displacement (Dp) of the at least one hydraulic pump arranged in the working hydraulic system.

18. A method according to claim 16, comprising adjusting the power balance by effecting at least one hydraulic valve arranged in the working hydraulic system.

19. A method according to claim 1, wherein the transmission line is arranged between the power source and driving wheels of the working machine for transmitting torque from the power source to the driving wheels.

20. A method according to claim 19, comprising adjusting the balancing of the provided power to the demanded power by effecting a controllable gearbox in the transmission line.

21. A method according to claim 1, comprising performing the balancing of the provided power to the demanded power by adding torque by means of at least one electric machine.

22. A method according to claim 21, wherein the transmission line is arranged between the power source and driving wheels of the working machine for transmitting torque from the power source to the driving wheels, the method comprising using the electric machine arranged upstream a transmission unit arranged in the transmission line, or upstream to gearbox arranged in the transmission line.

23. A method according to claim 22, wherein the hydraulic system comprises at least one hydraulic pump powered by the power source for moving an implement on the working machine and/or for steering the working machine, and wherein the power source is mechanically connected to the transmission line and the working hydraulic system.

24. A method according to claim 23, wherein the power consuming systems are connected to the power source via a branching-off portion, and the prediction model comprises a power summation point, which represents the branching off portion wherein the branching-off portion is defined by a fly wheel arranged on an output shaft of the power source.

25. A method according to claim 1, wherein the power source is an internal combustion engine.

26. A method according to claim 1, wherein the operated working machine is a wheel loader.

27. A working machine provided with: a power source adapted to provide power and a plurality of power consuming systems connected to the power source, wherein a first power consuming system is a hydraulic system of the working machine and a second power consuming system is a transmission line of the working machine, comprising:
- a control unit which is adapted to predict, via a prediction model, a power that will be demanded by the first and second power consuming systems at a subsequent time on the basis of operational parameters indicative of a power demand,
- means for detecting the operational parameters, the operational parameters comprising information that is at least indicative of a current working condition that is detected by measuring a rotational speed and measuring or estimating a torque, a monitored command, and characteristics of each one of the first and second power consuming systems, wherein the detection means is connected to the control unit and the control unit is configured to use the detected operational parameter in the prediction model, and
- means for balancing a provided power to the demanded power according to the prediction model, wherein the balancing means is connected to the control unit.

28. A working machine according to claim 27, wherein the operational parameters are indicative of a further working condition that is detected by measuring a hydraulic pressure and measuring or estimating a flow provided by a hydraulic pump in the first power consuming system.

29. A working machine according to claim 27, wherein the power consuming systems are connected to the power source via a branching-off portion.

30. A working machine according to claim 29, wherein the branching-off portion is defined by a fly wheel arranged on an output shaft of the power source.

31. A working machine according to claim 27, wherein an external power source is adapted for providing power by adding torque to at least one of the power consuming systems.

32. A working machine according to claim 27, wherein at least one electric machine is adapted for providing power by adding torque to at least one of the power consuming systems.

33. A working machine according to claim 27, wherein the means for power balancing is adapted to effect the power source and/or at least one of the power consuming systems.

34. A working machine according to claim 33, wherein the hydraulic system comprises at least one hydraulic pump powered by the power source for moving an implement on the working machine and/or for steering the working machine, and the means for power balancing is adapted to effect at least one hydraulic valve arranged in the working hydraulic system, and wherein the power source is mechanically connected to a transmission line and the working hydraulic system.

35. A working machine according to claim 27, wherein the hydraulic system comprises at least one hydraulic pump powered by the power source for moving an implement on the working machine and/or for steering the working machine.

36. A working machine according to claim 35, wherein the means for power balancing is adapted to decrease the displacement (Dp) of the at least one hydraulic pump arranged in the working hydraulic system.

37. A working machine according to claim 35, wherein the means for power balancing is adapted to effect at least one hydraulic valve arranged in the working hydraulic system.

38. A working machine according to claim 27, wherein the transmission line arranged between the power source and driving wheels of the working machine for transmitting torque from the power source to the driving wheels.

39. A working machine according to claim 38, wherein at least one electric machine is adapted for providing power by adding torque, and wherein the electric machine is arranged upstream a transmission unit arranged in the transmission line, or upstream a gearbox arranged in the transmission line.

40. A working machine according to claim 27, wherein the power source is an internal combustion engine.

41. A working machine according to claim 27, wherein working machine is a wheel loader.

* * * * *